(12) United States Patent
Yin et al.

(10) Patent No.: US 6,180,888 B1
(45) Date of Patent: *Jan. 30, 2001

(54) PULSED VOLTAGE SURGE RESISTANT MAGNET WIRE

(75) Inventors: Weijun Yin, Fort Wayne; Donald J. Barta, Monroeville, both of IN (US)

(73) Assignee: Phelps Dodge Industries, Inc., Fort Wayne, IN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/792,790

(22) Filed: Feb. 3, 1997

Related U.S. Application Data

(63) Continuation of application No. 08/488,606, filed on Jun. 8, 1995, now abandoned.

(51) Int. Cl.[7] .................................................. H01B 7/00
(52) U.S. Cl. ........................................ 174/110 R; 428/372
(58) Field of Search ............................ 174/110 R, 110 N, 174/116, 118, 106 SC, 127; 428/372, 379, 380, 383, 384, 385, 386, 389

(56) References Cited

U.S. PATENT DOCUMENTS

| | | | |
|---|---|---|---|
| 1,943,115 | * | 1/1934 | Ellis ........................................ 175/21 |
| 2,888,424 | * | 5/1959 | Precopio et al. ....................... 260/41 |
| 2,935,427 | * | 5/1960 | Hall et al. ............................ 117/218 |
| 3,022,200 | | 2/1962 | Koerner et al. . |
| 3,228,883 | * | 1/1966 | Di Giulio et al. .................. 252/63.2 |
| 3,496,139 | | 2/1970 | Markovitz . |
| 3,519,670 | | 7/1970 | Markovitz . |
| 3,577,346 | | 5/1971 | McKeown . |
| 3,645,899 | | 2/1972 | Linson . |
| 3,742,084 | | 6/1973 | Olyphant, Jr. et al. . |

(List continued on next page.)

FOREIGN PATENT DOCUMENTS

| | | |
|---|---|---|
| 0 396 928 A2 | 11/1990 | (EP) . |
| WO 98/33190 | 7/1998 | (WO) . |

OTHER PUBLICATIONS

Effect of Surge Wave Reflection Inside A Motor On Voltage Distribution Across Stator Winding; O.M. Nassar; AramCo; Apr. 1985.*

J.A. Oliver and G.C. Stone "Implication for the Application of Adjustable Speed Drive Electronics to Motor Stator Winding Insulation", IEEE Electrical Insulation Magazine, Jul./Aug. 1995, vol. 11, No. 4, pp. 32–36.

Weijun Yin, Keith Bultemeier, Don Barta and Dan Floryan, "Critical Factors for Early Failure of Magnet Wires in Inverter–Fed Motors", IEEE 1995 Annual Report Conference on Electrical Insulation and Dielectric Phenomena, pp 258–261.

(List continued on next page.)

Primary Examiner—Kristine Kincaid
Assistant Examiner—Chau N. Nguyen
(74) Attorney, Agent, or Firm—Barnes & Thornburg

(57) ABSTRACT

A pulsed voltage surge resistant magnet wire having a conductor and a continuous and concentric and flexible uniform coat of insulation material superimposed on the conductor. The insulation material has an effective amount of a particulate filler material dispersed throughout the material to increase the pulsed volt surge resistance of the insulation material by at least ten-fold in comparison testing at 20 kHz, 0.721 kV per mil, 50% duty cycle from about 30° C. to about 130° C. with rise times of about 83 kV per microsecond. The particulates of the filler have a size from about 0.005 microns to about 1.0 microns.

36 Claims, 1 Drawing Sheet

U.S. PATENT DOCUMENTS

| | | |
|---|---|---|
| 3,802,913 | 4/1974 | MacKenzie, Jr. . |
| 3,812,214 | 5/1974 | Markovitz . |
| 3,878,319 * | 4/1975 | Wahl ............................ 174/106 SC |
| 4,049,748 | 9/1977 | Bailey . |
| 4,102,851 | 7/1978 | Luck et al. . |
| 4,216,263 | 8/1980 | Otis et al. . |
| 4,331,733 | 5/1982 | Evans et al. . |
| 4,342,814 | 8/1982 | Usuki et al. . |
| 4,354,965 | 10/1982 | Lee et al. . |
| 4,385,136 * | 5/1983 | Ancker et al. .................. 523/215 X |
| 4,403,061 * | 9/1983 | Brooks et al. ...................... 524/433 |
| 4,405,687 | 9/1983 | Morita et al. . |
| 4,426,423 | 1/1984 | Intrater et al. . |
| 4,476,192 | 10/1984 | Imai et al. . |
| 4,493,873 * | 1/1985 | Keane et al. ........................ 428/372 |
| 4,503,124 | 3/1985 | Keane et al. . |
| 4,537,804 | 8/1985 | Keane et al. . |
| 4,546,041 | 10/1985 | Keane et al. . |
| 4,563,369 | 1/1986 | Lavallee . |
| 4,716,079 | 12/1987 | Sano et al. . |
| 4,760,296 * | 7/1988 | Johnston et al. ........................ 310/45 |
| 4,795,339 | 1/1989 | Escallon . |
| 4,806,806 * | 2/1989 | Hjortsberg et al. .................... 310/45 |
| 4,826,706 | 5/1989 | Hilker et al. . |
| 4,935,302 | 6/1990 | Hjortsberg et al. . |
| 4,970,488 * | 11/1990 | Horiike et al. ........................ 310/214 |
| 5,061,554 | 10/1991 | Hjortsberg et al. . |
| 5,066,513 | 11/1991 | Zurecki et al. . |
| 5,106,915 | 4/1992 | Rock et al. . |
| 5,171,937 | 12/1992 | Aldissi . |
| 5,209,987 | 5/1993 | Penneck et al. . |
| 5,253,317 | 10/1993 | Allen et al. . |
| 5,296,260 | 3/1994 | Sawada et al. . |
| 5,336,851 * | 8/1994 | Sawada et al. .................. 174/110 A |
| 5,350,638 | 9/1994 | Sawada et al. . |
| 5,384,429 | 1/1995 | Bulson et al. . |
| 5,393,612 | 2/1995 | Matsuura et al. . |
| 5,425,992 | 6/1995 | Tachikawa et al. . |
| 5,438,164 | 8/1995 | Green . |
| 5,455,392 | 10/1995 | Preu et al. . |
| 5,459,286 | 10/1995 | Bergman et al. . |
| 5,468,557 | 11/1995 | Nishio et al. . |
| 5,470,657 | 11/1995 | Hayami . |
| 5,521,010 | 5/1996 | Tanaka et al. . |
| 5,545,853 * | 8/1996 | Hildreth ........................... 174/120 R |
| 5,552,222 | 9/1996 | Bolon et al. . |
| 5,563,375 | 10/1996 | Hayami . |
| 5,612,510 | 3/1997 | Hildreth . |
| 5,625,168 | 4/1997 | Van Siclen, Jr. . |
| 5,654,095 * | 8/1997 | Yin et al. ..................... 174/110 R X |
| 5,656,796 | 8/1997 | Marinos et al. . |
| 5,660,932 | 8/1997 | Durston . |
| 5,661,266 | 8/1997 | Chang . |
| 5,861,578 | 1/1999 | Hake et al. . |

OTHER PUBLICATIONS

Weijun Yin, Keith Bultemeier, Don Barta and Dan Floryan, Dielectric Integrity of Magnet Wire Insulations Under Multi–Stresses, Proceeding of EEIC/EMCW, 1995, pp. 257–261.

Analysis of the Impact of Pulse–Width Modulated Inverter Voltage Waveforms on A. C. Motors; Austin H. Bennett; U.S. Electrical Motors, Division of Emerson Electric; No Date.

Corona Resistant Turn Insulation in AC Rotating Machine; D.R. Johnson, J.T. LaForte; Gen. Elec. Co., No Date.

Effect of Surge Wave Reflection Inside a Motor on Voltage Distribution Across Stator Windings; O.M. Nassar; Aramco; Apr. 1985; Saudi Arabia.

International Search Report Dated Apr. 27, 1998.

The Condensed Chemical Dictionary, Tenth Edition, Van Nostrand Reinhold Company, pp. 838, 921, 923, 1981.

A.M. Bruning, D.G. Kasture, F.J. Campbell and N.H. Turner "Effect of Cavity Sub–corona Current on Polymer Insulation Life" IEEE Transactions on Electrical Insulation, Aug. 1991, vol. 26 No. 4.

G.C. Stone, R. G. van Heeswijk and R. Bartnikas "Investigation of the Effect of Repetitive Voltage Surges on Epoxy Insulation," IEEE 1992.

R.H. Rehder "Preliminary Evaluation of Motor Insulation for Variable Speed Applications," pp. 333–336, No Date.

* cited by examiner

PULSED VOLTAGE SURGE RESISTANT MAGNET WIRE

This is a continuation of application Ser. No. 08/488,606 filed on Jun. 8, 1995, now abandoned.

BACKGROUND OF THE INVENTION

The present invention relates to an improved magnet wire, and more particularly, to an improved magnet wire which is highly resistant to repetitive or pulsed, high voltage spikes or surges.

Much has been written over the years about various types of variable frequency or pulse-width modulated (PWM) and/or inverter adjustable speed drives on AC motors and their affect on motor operation. PWM drives are known to have significant harmonics and transients which may alter the motor performance characteristics and life expectancy. The effects of maximum voltages, rates of rise, switching frequencies, resonances and harmonics have all been identified.

The PWM inverter is one of the newest and fastest evolving technologies in non-linear devices used in motor drive systems. The motivation for using PWM inverters is speed control of an AC motor comparable to the prior mechanical or DC adjustable speed drives without loss of torque. With the increased emphasis of energy conservation and lower cost, the use of higher performance PWM drives has grown at an exponential rate. However, it has been found that these PWM drives cause premature failure of the magnet wire insulation systems used in such AC motors.

It is therefore highly desirable to provide an improved magnet wire for use in AC motors having variable frequency or PWM and/or inverter drives.

It is also highly desirable to provide an improved magnet wire which has increased resistance to insulation degradation caused by pulsed voltage surges.

The basic stresses acting upon the stator and rotor windings can be broken down into thermal stresses, mechanical stresses, dielectrical stresses and environmental stresses. All of these stresses are impacted by voltage, voltage wave forms and frequencies, in that the longevity of the winding is predicated upon the integrity of the whole insulation system. During the early stages of applying various voltages, voltage wave forms and frequencies to AC motors, the major focus was on the thermal stress generated by the unwanted drive harmonics passing through to the motor and the associated heating. The other critical factor dealt with the increased heating caused by reduced cooling capacity at slower speeds. While more attention was given initially to rotor bar shapes than to stator insulation voltage withstand capability, the present drive technology, which uses much higher switching rates (sometimes referred to as carrier frequencies) requires the focus to involve both the stator winding system and the rotor winding system.

The standard magnet wire used by most motor manufacturers is typically class H magnet wire. In accordance with the ANSI/NEMA magnet wire standard (ANSI/NEMA MW1000-1993), this wire, under ideal conditions (twisted wire pair tests) is capable of a withstand voltage of 5,700 volts at a rise time not to exceed 500 volts per second. However, it has been found that utilizing current drive technology a magnet wire may have to withstand voltage surges approaching 3,000 volts, voltage rises from about 0.5 kV per micro second to about 100 kV per micro second, frequencies from about 1 kHz to about 20 kHz, and temperatures for short periods of time approaching 250° C. to 300° C. It has also been found that in certain circumstances, a surge is reflected so as to reinforce a primary surge wave voltage at succeeding coils to produce front times exceeding 3 micro seconds in subsequent coils.

These values are based upon the assumption that the wire film is applied concentrically to the conductor and that no appreciation of film thickness occurs in the manufacturing process or operation of the motor at high operating temperatures or that turn to turn bond strength may decrease significantly. Hence, coil movement and abrasion that reduce the thickness of the turn insulation over time can cause premature failure of the turn insulation.

Therefore, it is highly desirable to provide an improved magnet wire which can withstand voltage surges approaching 3,000 volts having rise times between 1.0 kV and 100 kV per micro second and temperature rises to 300° C. frequencies of less than 20 kHz after the insertion of the windings in a motor rotor and stator at normal operating temperatures over the anticipated lifetime of the motor.

It is also highly desirable to provide an improved magnet wire which will pass the ANSI/NEMA magnet wire standards MW1000 and in addition to ANSI/NEMA MG1-Parts 30 and 31 being developed for constant speed motors on a sinusoidal bus and general purpose induction motors used with variable frequency controls, or both, and definite purpose inverter fed motors, respectively.

A number of investigations to determine more accurately the voltage endurance levels of the present proposed insulation systems preliminarily indicate that the transient voltage levels combined with the operating temperatures of such motors can exceed corona starting levels. Some have blamed corona for the insulation failures in motors having variable frequency, PWM and/or inverter drives. Others have discounted corona as the culprit inasmuch as failure occurred in portions of the winding where the electrical field is low. While it is known that conventional enamels degrade when exposed to high voltage corona discharge, and that corona is discharged between adjacent windings of motor insulation, due to the inevitable voids and the high voltage ionization of air in the voids of the motor stator and rotor insulation windings, it has been found that insulation failure of motors driven by PWM, variable frequency and/or inverter drives is not primarily a corona insulation degradation mechanism.

Corona aging and magnet wire failure conditions may be distinguished from pulsed voltage surge aging and magnet wire failure conditions. Corona aging conditions occur in the presence of a gas (usually air in magnet wire windings) at positions of localized high electrical stress (AC or DC), that is strong enough to break down or ionize the gas, to produce electron or ion energy strong enough to break down polymer chains or to create ionic radicals via chemical reactions. The chemical reactions result in polymer degradation. Corona discharge is a relatively "cold discharge" and temperature is usually not a substantial factor. Magnet wire aging/failure due to corona is usually a long-term process.

In contrast, pulsed voltage surge aging and magnet wire failure does not require the presence of a gas media. Pulsed voltage surge failure instead requires repetitive or pulsed voltage surges having relatively short rise times, or high voltage to rise time ratios, relatively high frequency of pulse, and relatively high impulse energy, and occurs in relatively high temperatures generated thereby. Given high voltages and minimum rise times, pulsed voltage surge failure can occur relatively quickly, and is believed to be the predominate cause of failure in variable frequency, PWM and/or inverter driven motors.

It is therefore highly desirable to provide an improved magnet wire which meets all of the performance characteristics desired by motor manufacturers for stator and rotor windings for use under corona discharge conditions.

Finally, it is also highly desirable to provide an improved magnet wire which possesses all of the above-identified features.

SUMMARY OF THE INVENTION

It is therefore an object of the invention to provide an improved magnet wire for use in AC motors having variable frequency or PWM and/or inverter drives.

It is also an object of the invention to provide an improved magnet wire which has increased resistance to insulation degradation caused by pulsed voltage surges.

It is also an object of the invention to provide an improved magnet wire which can withstand voltage surges approaching 3,000 volts having rise times between 1.0 kV and 100 kV per micro second and temperature rises to 300° C. frequencies of less than 20 kHz after the insertion of the windings in a motor rotor and stator at normal operating temperatures over the anticipated lifetime of the motor.

It is also an object of the invention to provide an improved magnet wire which will pass the ANSI/NEMA magnet wire standards MW1000 and in addition to ANSI/NEMA MG1-Parts 30 and 31 being developed for constant speed motors on a sinusoidal bus and general purpose induction motors used with variable frequency controls, or both, and definite purpose inverter fed motors, respectively.

It is also an object of the invention to provide an improved magnet wire which meets all of the performance characteristics desired by motor manufacturers for stator and rotor windings for use under corona discharge conditions.

Finally, it is an object of the invention to provide an improved magnet wire which possesses all of the above-identified features.

In the broader aspects of the invention, there is provided a pulsed voltage surge resistant magnet wire comprising a conductor and a continuous and concentric and flexible uniform coat of insulation material superimposed on the conductor. The insulation material has an effective amount of a particulate filler material dispersed throughout the material to increase the pulsed volt surge resistance of the insulation material by at least ten-fold in comparison testing at 20 kHz, 0.721 kV per mil, 50% duty cycle from about 30° C. to about 130° C. with rate of rise of about 83 kV per microsecond. The particulates of the shield have a size from about 0.005 microns to about 1.0 microns.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
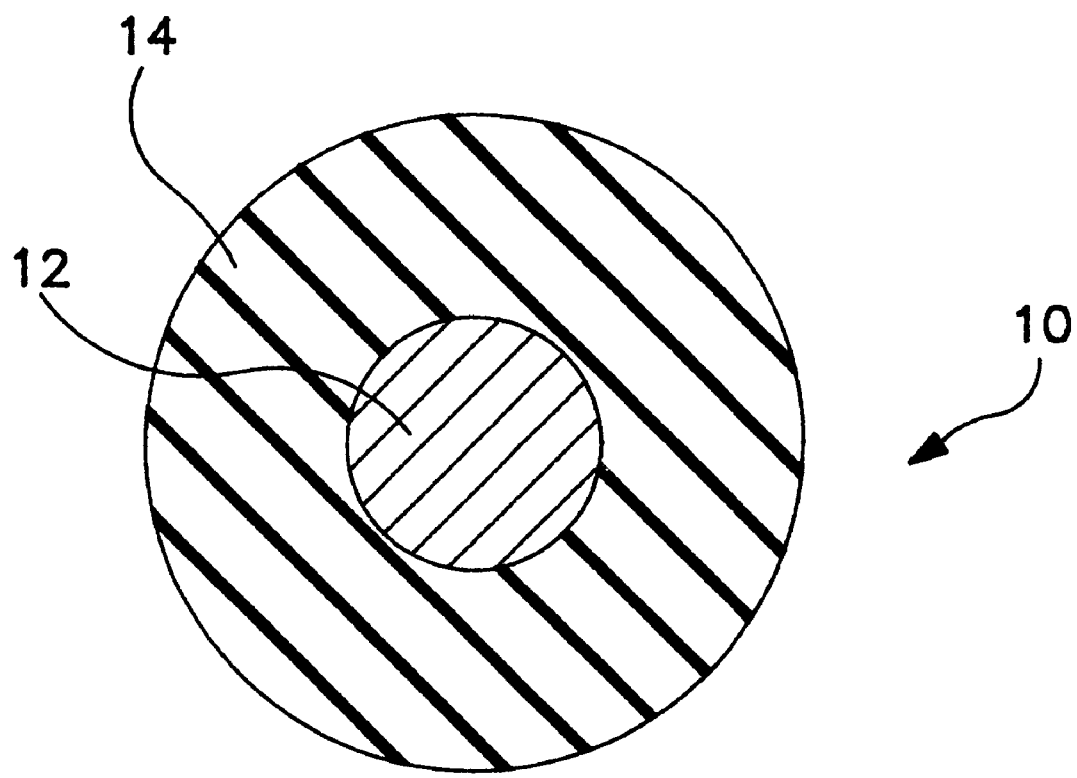
FIG. 1 is a cross-sectional view of a magnet wire showing an electrical conductor having the improved pulsed voltage surge resistant insulation thereon.

The improved magnet wire 10 of the invention includes a conductor 12, a continuous and concentric and flexible and uniform coat of base insulation material 14.

Conductor 12 is a magnet wire conductor meeting all of the specifications of ANSI/NEMA MW1000 standards. Conductor 12 may be a copper or aluminum conductor in specific embodiments. Base insulation material 14 is applied to the conductor 12 in a conventional manner to provide a continuous and concentric and flexible and uniform coat of base insulation superimposed on the conductor 12.

Insulation material 14 can be of a variety of materials. These materials include polyester, polyamide, polyimide, NYLON, polyvinyl acetal or FORMVAR, polyurethane, polyetherimide, polyesteramideimide, epoxy, acrylic, polyamideimide, polyesterimide, and polyarylsulfone materials. All other commercial, and disclosed, but not commercial, base insulation materials are also expected to exhibit increased pulsed voltage surge resistance in accordance with the invention and are included herein.

A primary property of the improved pulsed voltage surge resistant magnet wire of the invention is that, in all embodiments, the base insulation 14 of the magnet wire is maintained inviolate and merely shielded from degradation due to pulsed volt surges such as above-identified and experienced with variable frequency, PWM and/or inverter drives of AC motors. Thus, the magnet wires of this invention having, for example, polyester base insulations, should perform in all applications as well as the prior art magnet wires comprising a conductor 12 and a polyester base insulation material 14. In addition, the magnet wire of the invention has an extended life in comparison to prior art magnet wire when exposed to pulsed voltage surge resistance in use. Thus, the base insulation of the invention is designed to remain intact throughout the life of the winding, and that the base insulation will perform as designed to appropriately space apart adjacent conductors 12 and to provide the designed in dielectric insulative properties of the base insulation material.

The base insulation 14 of the magnet wire 10 of the invention comprises a coat of resinous material in which from about 1% to about 65% weight thereof is a particulate filler having a particle size from about 0.005 microns to about 1 micron. Various particulate fillers can be used in the invention. These include metal oxides, such as titanium dioxide, alumina, silica, zirconium oxide, iron oxide and zinc oxide, various naturally occurring clays, and combinations thereof. In specific embodiments, the clays may be POLYFIL 90 hydrous clay, WC-426 and TRANSLINK77 anhydrous clay, ASP ULTRAFINE hydrous clay and/or ECC-TEX hydrous clay, and the iron oxides may be BAYFERROX 110 or 105M.

Each of the fillers have a preferred particle range from about 0.01 microns to about 0.8 microns. Each of the fillers also have a preferred surface area measured in square meters per gram of from about 9 to about 250.

The base insulation 14 of the invention may be superimposed on conductor 12 by conventional means such as traditional solvent application, traditional extrusion applications as taught in U.S. Pat. No. 5,279,863. In specific embodiments, the base insulation 14 of the invention includes from about 5% to about 35% weight powdered filler material of the total applied resin and filler material, and from about 5% to about 65% of the filled resinous magnet wire insulation material used as a binder. The resin binder may be any magnet wire insulation material such as those above listed.

The following examples are presented herein to more fully illustrate the present invention. While specific magnet wire conductors and insulation materials and particulate filler materials and conductors are described in these examples, it should be understood that each of the above generally identified magnet wire insulation materials and particulate filler materials may be substituted for those disclosed in the examples and/or combinations thereof to produce a useful magnet wire insulation of the invention and applied to either copper or aluminum magnet wire conductors. Thus, a variety of magnet wires of the invention are possible, all being well within the inventions disclosed, reasonable scientific certainty, and the understanding of persons skilled in the art of magnet wire design, construction and manufacture:

EXAMPLE I

50–300 grams of fumed titanium dioxide (TiO2) particulate filler having an average particle size of 0.021 microns and a surface area of about 35 to about 65 square meters per gram was intimately mixed into 1,200 grams of a conventional polyester magnet wire enamel comprising 38.2% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE II

50–300 grams of fumed alumina (Al2O3) particulate filler having an average particle size of 0.013 microns and a surface area of about 85 to about 115 square meters per gram was intimately mixed into 1,200 grams of a conventional polyester magnet wire enamel comprising 38.2% weight resin in a commercially available cresol, phenol, and aromatic hydrocarbon solvent. The mixture was stirred at high speed to disperse the particulate filler through-out the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE III

65–160 grams of fumed silica (SiO2) particulate filler having an average particle size of 0.016 microns and a surface area of about 90 to about 130 square meters per gram was intimately mixed into 1602 grams of a conventional polyester magnet wire enamel comprising 38.2% weight resin in a commercially available cresol, phenol, and aromatic hydrocarbon solvent. The mixture was stirred at high speed to disperse the particulate filler through-out the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE IV

150–2,800 grams of zinc oxide (ZnO) particulate filler having an average particle size of 0.12 microns and a surface area of about 90 square meters per gram was intimately mixed into 2,584 grams of a conventional polyester magnet wire enamel comprising 38.2% weight resin in a commercially available cresol, phenol, and aromatic hydrocarbon solvent. The mixture was ultimately mixed by a conventional ball mill to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE V

100–600 grams of equal parts of fumed titanium dioxide (TiO2), fumed alumina and zinc oxide particulate fillers having an average particle size of 0.016 microns and an average surface area of about 92 square meters per gram was intimately mixed into 2,580 grams of a conventional polyester magnet wire enamel comprising 38% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE VI

40–140 grams of fumed silica (SiO2) particulate fillers having an average particle size of 0.016 microns and an average surface area of about 90 to about 130 square meters per gram was intimately mixed into 1,687 grams of a polyarylsulfone magnet wire enamel comprising 21% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 16 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE VII 100 grams of fumed titanium dioxide (TiO2) particulate filler having an average particle size of 0.021 microns and a surface area of about 35 to about 65 square meters per gram was intimately mixed into 1,200 grams of a polyarylsulfone magnet wire enamel comprising 21% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 16 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE VIII

30–180 grams of fumed alumina (Al2O3) particulate filler having an average particle size of 0.013 microns and a surface area of about 85 to about 115 square meters per gram was intimately mixed into 1,600 grams of a polyarylsulfone magnet wire enamel comprising 21% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 16 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE IX

40–400 grams of zinc oxide (ZNO) particulate filler having an average particle size of 0.12 microns and a surface area of about 90 square meters per gram was intimately mixed into 2,580 grams of a polyarylsulfone magnet wire enamel comprising 21% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 16 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE X

140–1,600 grams of equal parts of fumed titanium dioxide (TiO2), fumed alumina and zinc oxide particulate fillers having an average particle size of 0.016 microns and an average surface area of about 92 square meters per gram was intimately mixed into 2,560 grams of a polyarylsulfone magnet wire enamel comprising 21% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 16 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE XI

75–250 grams of WC-426 clay particulate filler having an average particle size of 0.7 microns and a surface area of about 13 to about 17 square meters per gram was intimately mixed into 1,500 grams of a conventional polyester magnet wire enamel comprising 38.2% weight resin in a commercially available cresol, phenol, aromatic hydrocarbon solvent. The mixture was ball milled to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE XII

75–450 grams of WC-426 clay particulate filler having an average particle size of 0.7 microns and a surface area of about 13 to about 17 square meters per gram was intimately mixed into 1,500 grams of a polyarylsulfone magnet wire enamel comprising 21% weight resin in a commercially available cresol, phenol, aromatic hydrocarbon solvent. The mixture was ball mired to disperse the particulate filler throughout the enamel. The resultant filled enamel was then applied to a bare 18 AWG copper magnet wire conductor by employing dyes in a conventional magnet wire coating tower at 16 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE XIII

60–240 grams of iron oxide (Fe2O3) particulate filler having an average particle size of 0.09 microns was intimately mixed into 1,200 grams of a conventional polyester magnet wire enamel comprising 38.2% weight resin in a commercially available cresol, phenol, aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE XIV

60–240 grams of fumed zirconium oxide (Zr2O3) particulate filler having an average particle size of 0.03 microns and a surface area of about 30 to about 50 square meters per gram was intimately mixed into 1,200 grams of a conventional polyester magnet wire enamel comprising 38.2% weight resin in a commercially available phenol, cresol, aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE XV

A conventional polyester magnet wire enamel comprising 38.2% weight resin in a commercially available cresol, phenol was applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

EXAMPLE

A polyarylsulfone magnet wire enamel comprising 21% weight resin in a commercially available cresol, phenol, and aromatic hydrocarbon solvent. The mixture was stirred at high speed to disperse the particulate filler throughout the enamel. The resultant filled enamel was then applied to a bare 18 AWG copper magnet wire conductor by employing dyes in a conventional magnet wire coating tower at 34 meters per minute, having temperatures of 450° F., 500° F., 550° F., respectfully. 10 passes were applied in this manner.

The resultant magnet wire was tested in accordance with standard magnet wire test procedures. The test results are shown in Table I.

The specific test equipment utilized includes a laboratory oven in which a sample cell is positioned. The sample cell is connected in series to a pulse generator and a signal conditioner. The signal conditioner and the pulse generator are connected to an oscilloscope. A bipolar power supply is connected in parallel to the sample cell and the oscilloscope between the pulse generator and the signal conditioner. In the specific test facility utilized, peak to peak voltage could be varied from 1,000 to 5,000 volts, repetitive frequency could be varied from 60 Hz to 20 kHz, and rise time of the pulse could be varied from 60 nano seconds to 250 nano seconds for a pulse of 5,000 volts.

A standard twisted wire pair was used for each test. The twisted wire pair was mounted in the sample cell. 18 AWG wire was used in each test. Each wire pair was twisted 8 revolutions. The insulation was stripped off at each end of the twisted pair. The remaining conductor portion was used as an electrode. One end of the wire was connected to the positive output of the pulse generator, and the other end to the negative output of the pulse generator. The other side of the twisted pair were kept apart.

The magnet wire made in accordance with Examples I through XVI hereinabove were tested in accordance with the pulsed voltage surge resistant magnet wire test in which a twisted pair of insulated conductors of the invention were subjected to a pulsed wave at a frequency of 20 kHz at temperatures ranging from 30° C. to 90° C. having a 50% duty cycle as shown in Table I. All of the data reported was at a rate of rise of 83 kV per microsecond. The electrical stress applied to the twisted pair ranged from 0.7 to 1 kV per mil. The extended life of the pulsed voltage surge resistant magnet wire is shown to be ten-fold over the magnet wire without the pulsed voltage surge resistant shield of the invention.

TABLE I

| Example | I | II | III | IV | V | VI |
|---|---|---|---|---|---|---|
| Speed - mpm | 34 | 34 | 34 | 34 | 34 | 16 |
| Surface rating | 1.4 | 1.2 | 1.1 | 1.3 | 1.2 | 1.3 |
| Insulation build - mils | 3.0 | 3.0 | 3.0 | 3.0 | 3.0 | 2.8–2.9 |
| Elongation - % | 42 | 42 | 41 | 40 | 42 | 43 |

TABLE I-continued

| Mandrel Flex | 30% 3X OK | 35% 3X OK | 20% 3X OK | 35% 3X OK | 20% 3X OK | 20% 3X OK |
|---|---|---|---|---|---|---|
| Snap | OK | OK | OK | OK | OK | OK |
| Snap Flex | OK 3X | OK 3X | OK 3X | OK 3X | OK 3X | OK 3X |
| Dielectric Breakdown - V | 10,800 | 10,630 | 10,750 | 10,180 | 10,570 | 5,810 |
| Time to Fail 20 kHz, 2kV, 50% Duty Cycle, Seconds | >40,000 90° C. | >40,000 90° C. | >40,000 90° C. | >40,000 90° C. | >30,000 90° C. | >40,000 90° C. |
| Size, AWG | 18 | 18 | 18 | 18 | 18 | 18 |
| Conductor | Copper | Copper | Copper | Copper | Copper | Copper |

| Example | VII | VIII | IX | X | XI | XII |
|---|---|---|---|---|---|---|
| Speed - mpm | 16 | 16 | 16 | 16 | 34 | 34 |
| Surface rating | 1.2 | 1.3 | 1.3 | 1.2 | 1.1 | 1.1 |
| Insulation build - mils | 2.9–3.0 | 2.9–3.0 | 3.0 | 2.9–3.0 | 3.2–3.4 | 30.–3.1 |
| Elongation - % | 41 | 43 | 40 | 42 | 42 | 42 |
| Mandrel Flex | 30% 3X OK | 30% 3X OK | 35% 3X OK | 20% 3X OK | 3X OK | 3X OK |
| Snap | OK | OK | OK | OK | OK | OK |
| Snap Flex | OK 3X | OK 3X | OK 3X | OK 3X | OK 3X | OK 3X |
| Dielectric Breakdown - V | 5,850 | 5,780 | 5,750 | 5,730 | 10,730 | 5,800 |
| Time to Fail 20 kHz, 2 kV, 50% Duty Cycle, Seconds | >20,000 90° C. | >20,000 90° C. | >20,000 90° C. | >2,000 90° C. | >3,000 90° C. | >3,000 90° C. |
| Size, AWG | 18 | 18 | 18 | 18 | 18 | 18 |
| Conductor | Copper | Copper | Copper | Copper | Copper | Copper |

| Example | XIII | XIV | XV | XVI |
|---|---|---|---|---|
| Speed - mpm | 34 | 34 | 34 | 16 |
| Surface rating | 1.1 | 1.1 | 1.4 | 1.2 |
| Insulation build - mils | 3.0 | 3.0 | 3.0 | 2.9–3.0 |
| Elongation - % | 42 | 41 | 42 | 41 |
| Mandrel Flex | 3X OK | 3X OK | 30% 3X OK | 30% 3X OK |
| Snap | OK | OK | OK | OK |
| Snap Flex | OK 3X | OK 3X | OK 3X | OK 3X |
| Dielectric Breakdown - V | 10,230 | 10,150 | 10,800 | 5,850 |
| Time to Fail 20 kHz, 2 kV, 50% Duty Cycle, Seconds | >40,000 90° | >40,000 90° | 666 90° | 470 90° |
| Size, AWG | 18 | 18 | 18 | 18 |
| Conductor | Copper | Copper | Copper | Copper |

The improved magnet wire of the invention provides an improved magnet wire for use in such AC motors which has increased resistance to insulation degradation caused by pulsed voltage surges. The improved magnet wire of the invention provides an improved magnet wire which can withstand voltage surges approaching 3,000 volts having rates of rise of about 1.0 kV per micro second to about 100 kV per micro second frequencies from about 1 kHz to about 20 kHz, temperatures for short periods of time of about 300° C. after the insertion of the windings in a motor rotor and stator over anticipated lifetime of the motor. The improved magnet wire of the invention provides an improved magnet wire which will pass all of the dimensional ANSI/NEMA magnet wire standards MW1000 and in addition NEMA MG1-Parts 30 and 31 for constant speed motors on a sinusoidal bus and general purpose motors used with variable frequency controls, or both, and definite purpose inverter fed motors, respectively. The improved magnet wire of the invention provides an improved magnet wire which meets all of the performance characteristics desired by motor manufacturers for stator and rotor windings for use under corona discharge conditions.

While there have been described above principles of the invention in connection with a specific magnet wire insulating materials and specific particulate fillers, it is to be clearly understood that this description is made only by way of example, and not as a limitation of the scope of the invention.

What is claimed is:

1. A pulsed voltage surge resistant magnet wire comprising a conductor and a continuous and concentric and uniform and flexible coat of insulation material superimposed on said conductor, said insulation material being an insulative polymeric material and having an effective amount of shielding particulate filler material dispersed throughout said coat to increase the pulsed voltage surge resistance of said insulation material by at least ten-fold in comparison testing at 20 kHz, 0.7 to 1 kV per mill, 50% duty cycle, from about 30° to 130° C. and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 microns to about 1.0 microns.

2. The magnet wire of claim 1 wherein said insulation material is chosen from the group of polymeric materials consisting of polyamides, polyimides, polyvinyl acetals, polyurethanes, polyetherimides, epoxies, acrylics, polyamideimides, polyesters, polyesterimide, polyamide esters, polyesteramideimides, polyimide esters and combinations thereof.

3. The magnet wire of claim 1 wherein said filler material has a particulate size from about 0.01 to about 0.8 microns.

4. The magnet wire of claim 1 wherein said conductor is chosen from the group of copper and aluminum conductors, and said magnet wire meets all of the dimensional specifications of the ANSI/NEMA MW1000 standards 1993.

5. The magnet wire of claim 1 wherein said filler material is dispersed throughout said coat of insulation material.

6. The magnet wire of claim 1 wherein said filler material is present in the insulation material from about 1% to about 65% by weight of said insulation material.

7. The magnet wire of claim 1 wherein said filler material is a metallic oxide having a particulate size from about 0.01 to about 0.8 microns in an amount of less than 20% weight of said insulation material.

8. A pulsed voltage surge resistant magnet wire comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, and having particulates of a size from about 0.005 microns to about 1.0 microns, said insulation material is chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof.

9. A pulsed voltage surge resistant magnet wire comprising a conductor and a continuous and concentric and uniform and flexible coat of insulation material superimposed on said conductor, said insulation material having an effective amount of particulate non-conductive shielding filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 microns to about 1.0 microns, said insulation material being chosen from the group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material being present in the insulation material from about 1% to about 65% by weight of said insulation material.

10. A pulsed voltage surge resistant magnet wire comprising a conductor and a continuous and concentric and uniform and flexible coat of insulation material superimposed on said conductor, said insulation material being an insulative polymeric material and having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.01 to about 0.8 microns, said shielding particulate filler material being present in the insulation material from about 1% to about 65% by weight of said insulation material.

11. A pulsed voltage surge resistant magnet wire comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said insulation material is chosen from the group of polymeric materials consisting of polyamides, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material is chosen from the group of metal oxides consisting of titanium dioxide, alumina, silica, zirconium oxide, zinc oxide, iron oxide and combinations thereof.

12. A pulsed voltage surge resistant magnet wire comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said insulation material being chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material being metallic oxide having a particulate size from about 0.01 to about 0.8 microns in an amount of less than 20% weight of said insulation material, said shielding particulate filler material being chosen from a group of metal oxides consisting of titanium dioxide, alumina, silica, zirconium oxide, zinc oxide, iron oxide and combinations thereof.

13. A magnet wire for use in PWM, variable frequency motors comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said particulates of said shielding particulate filler material having a size from about 0.005 microns to about 1.0 microns.

14. The magnet wire of claim 13 wherein said insulation material is chosen from the group of polymeric materials consisting of polyamides, polyimides, polyvinyl acetals, polyurethanes, polyetherimides epoxies, acrylics, polyamideimides, polyesters, polyesterimide, polyamide esters, polyesteramideimides, polyimide esters and combinations thereof.

15. The magnet wire of claim 13 wherein said filler material has a particulate size from about 0.01 to about 0.8 microns.

16. The magnet wire of claim 13 wherein said conductor is chosen from the group of copper and aluminum conductors, and said magnet wire meets all of the dimensional specifications of the ANSI/NEMA MW1000 standards 1993.

17. The magnet wire of claim 13 wherein said filler material is dispersed throughout said coat of insulation material.

18. The magnet wire of claim 13 wherein said filler material is present in the insulation material from about 1% to about 65% by weight of said insulation material.

19. The magnet wire of claim 13 wherein said filler material is a metallic oxide having a particulate size from about 0.01 to about 0.8 microns in an amount of less than 20% weight of said insulation material.

20. A magnet wire for use in PWM, variable frequency motors comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 microns to about 1.0 microns, said insulation material being chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof.

21. A magnet wire for use in PWM, variable frequency motors comprising a conductor and a continuous and concentric and uniform and flexible coat of insulation material superimposed on said conductor, said insulation material having an effective amount of shielding particulate non-conductive filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 microns to about 1.0 microns, said insulation material being chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material being present in the insulation material from about 1% to about 65% by weight of said insulation material.

22. A magnet wire for use in PWM, variable frequency motors comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.01 to about 0.8 microns, said shielding particulate filler material is present in an insulation material from about 1% to about 65% by weight of said insulation material.

23. A magnet wire for use in PWM, variable frequency motors comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said insulation material is chosen from a group of polymeric materials consisting of polyamides, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material has a particulate size from about 0.01 to about 0.8 microns, said shielding particulate filler material is chosen from the group of metal oxides consisting of titanium dioxide, alumina, silica, zirconium oxide, zinc oxide, iron oxide and combinations thereof.

24. A magnet wire for use in PWM, variable frequency motors comprising a conductor and a continuous and concentric and uniform and flexible coat of insulation material superimposed on said conductor, said insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said insulation material is chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material is a metallic oxide having a particulate size from about 0.01 to about 0.8 microns in an amount of less than 20% weight of said insulation material, said shielding particulate filler material being chosen from a group of metal oxides consisting of titanium dioxide, alumina, silica, zirconium oxide, zinc oxide, iron oxide and combinations thereof.

25. A pulsed voltage surge resistance insulation material comprising an insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 to about 1.0 microns.

26. The insulation material of claim 25 wherein said insulation material is chosen from the group of polymeric materials consisting of polyamides, polyimides, polyvinyl acetals, polyurethanes, polyetherimides, epoxies, acrylics, polyamideimides, polyesters, polyesterimide, polyamide esters, polyesteramideimides, polyimide esters and combinations thereof.

27. The insulation material of claim 25 wherein said filler material has a particulate size from about 0.01 to about 0.8 microns.

28. The insulation material of claim 25 wherein said conductor is chosen from the group of copper and aluminum conductors, and said magnet wire meets all of the dimensional specifications of the ANSI/NEMA MW1000 standards 1993.

29. The insulation material of claim 25 wherein said filler material is dispersed throughout said coat of insulation material.

30. The insulation material of claim 25 wherein said filler material is present in the insulation material from about 1% to about 65% by weight of said insulation material.

31. The insulation material of claim 25 wherein said filler material is a metallic oxide having a particulate size from about 0.01 to about 0.8 microns in an amount of less than 20% weight of said insulation material.

32. A pulsed voltage surge resistant insulation material comprising an insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 microns to about 1.0 microns, said insulation material being chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof.

33. A pulsed voltage surge resistant insulation material comprising an insulation material having an effective amount of shielding particulate non-conductive filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.005 microns to about 1.0 microns, said insulation material being chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material being present in an insulation material from about 1% to about 65% by weight of said insulation material.

34. A pulsed voltage surge resistant insulation material comprising an insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C., and a rate of rise of about 83 kV per microsecond, said shielding particulate filler material being chosen from a group of metal oxides consisting of titanium dioxide, alumina, silica, zirconium oxide, zinc oxide, iron oxide and combinations thereof, said shielding particulate filler material having particulates of a size from about 0.01 to about 0.8 microns, said shielding particulate filler material being present in an insulation material from about 1% to about 65% by weight of said insulation material.

35. A pulsed voltage surge resistant insulation material comprising an insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said insulation material is chosen from the group of polymeric materials consisting of polyamides, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material has a particulate size from about 0.01 to about 0.8 microns, said shielding particulate filler material is chosen from the group of metal oxides consisting of titanium dioxide, alumina, silica, zirconium oxide, zinc oxide, iron oxide and combinations thereof.

36. A pulsed voltage surge resistant insulation material comprising an insulation material having an effective amount of shielding particulate filler material dispersed throughout said coat to increase the pulsed voltage surge resistance of said insulation material by at least ten-fold in comparison testing at 20 kHz, 0.7 to 1 kV per mil, 50% duty cycle, from about 30° to 130° C. and a rate of rise of about 83 kV per microsecond, said insulation material being chosen from a group of polymeric materials consisting of polyamide, polyimides, polyvinyl acetals, polyurethanes, polyetherimides, epoxies, acrylics, polyamideimides, polyesters, polyesterimide, polyamide esters, polyesteramideimides, polyimide esters and combinations thereof, said shielding particulate filler material is a metallic oxide having a particulate size from about 0.01 to about 0.8 microns in an amount of less than 20% weight of said insulation material, said shielding particulate filler material being chosen from a group of metal oxides consisting of titanium dioxide, alumina, silica, zirconium oxide, zinc oxide, iron oxide and combinations thereof.

* * * * *